(No Model.)  3 Sheets—Sheet 1.

W. R. FOWLER.
ENDLESS BELT CONVEYER.

No. 274,306.  Patented Mar. 20, 1883.

WITNESSES:
Harry Drury
Alexander Bartoff

INVENTOR:
William R. Fowler
By his attys
Howson and Sons

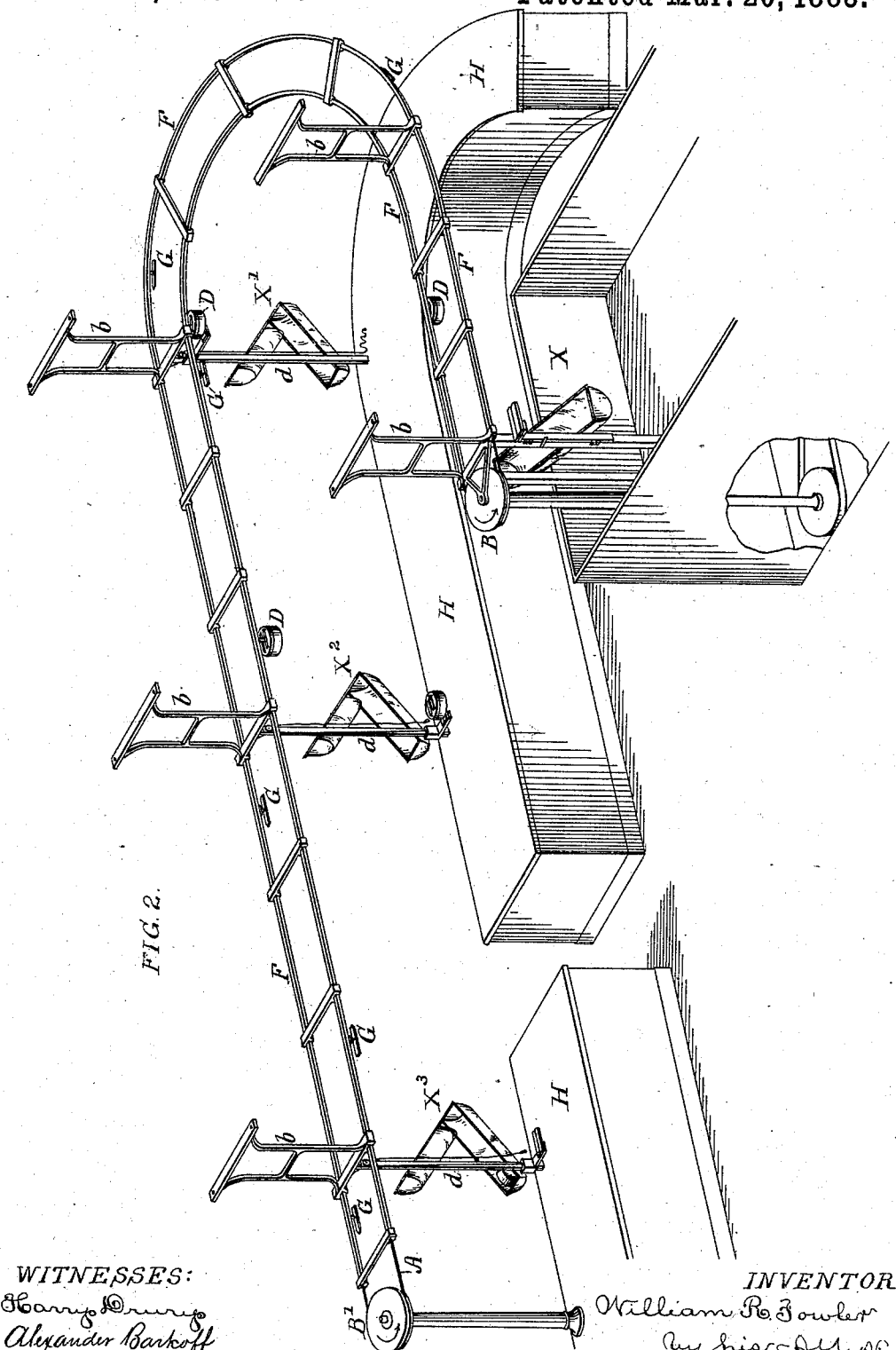

(No Model.) 3 Sheets—Sheet 3.
W. R. FOWLER.
ENDLESS BELT CONVEYER.
No. 274,306. Patented Mar. 20, 1883.
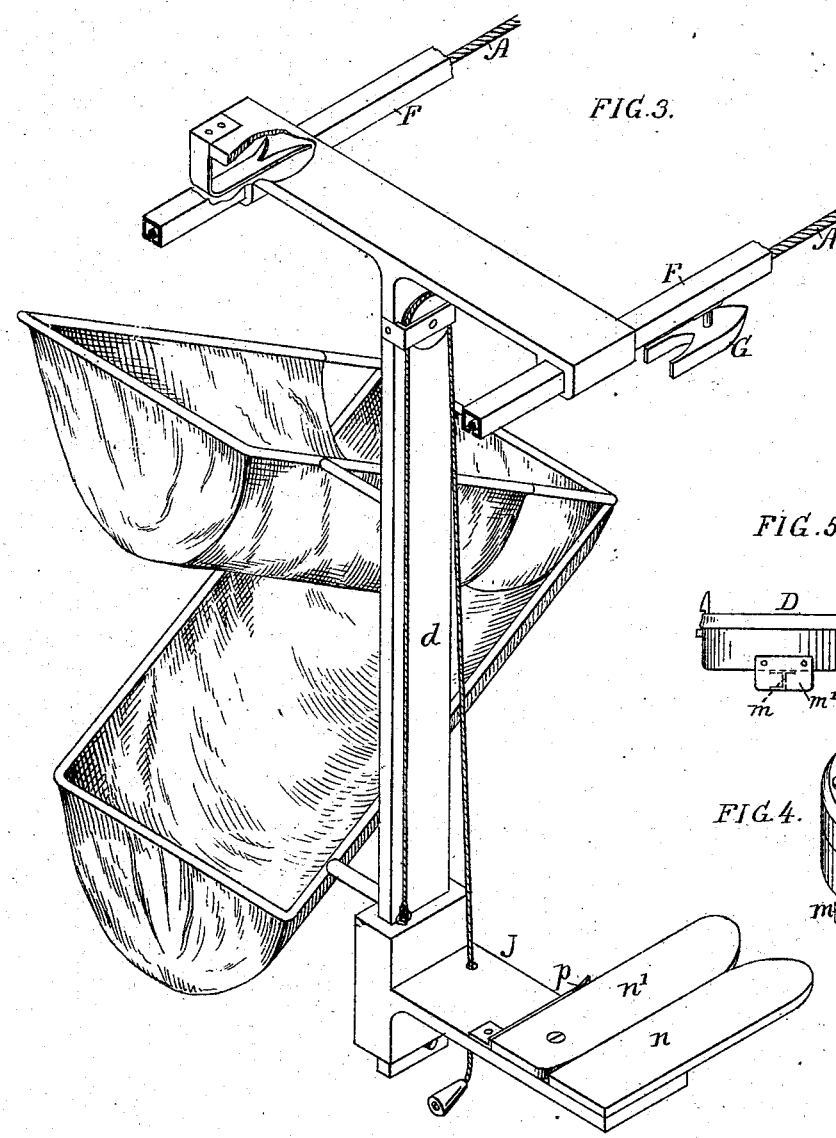
WITNESSES: INVENTOR:

UNITED STATES PATENT OFFICE.

WILLIAM R. FOWLER, OF PHILADELPHIA, PENNSYLVANIA, ASSIGNOR, BY MESNE ASSIGNMENTS, TO LEWIS J. MYERS, OF SAME PLACE.

ENDLESS-BELT CONVEYER.

SPECIFICATION forming part of Letters Patent No. 274,306, dated March 20, 1883.

Application filed December 26, 1882. (No model.)

*To all whom it may concern:*

Be it known that I, WILLIAM R. FOWLER, a citizen of the United States, and a resident of Philadelphia, Pennsylvania, have invented certain Improvements in Endless-Belt Conveyers, of which the following is a specification.

The object of my invention is to provide simple and efficient means for conveying boxes or receptacles from different points to a central station, and from said station back to the different points from which they were sent, the device being intended mainly as cash-conveyer for stores in place of the pneumatic and inclined-plane devices which have been proposed for this purpose.

Figure 1:
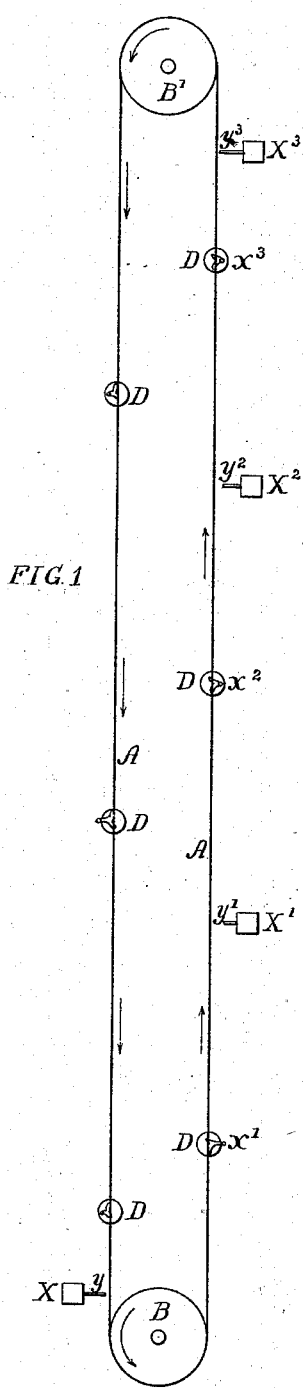
Figure 6:
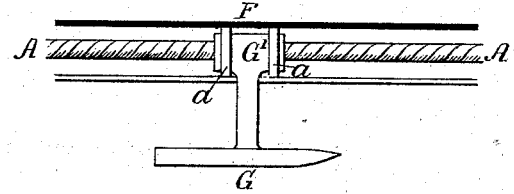
Figure 7:
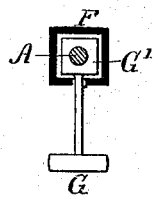

In the accompanying drawings, Figure 1, Sheet 1, is a diagram illustrating the essential features of my invention; Fig. 2, Sheet 2, a perspective view of the device, showing more of the details of the invention; Fig. 3, Sheet 3, an enlarged perspective view of one of the stations; Fig. 4, a perspective view of one of the boxes or receptacles; Fig. 5, a rear view of the same opened; and Figs. 6, 7, 8, and 9, Sheet 1, detached views of parts of the device.

In the diagram, Fig. 1, A represents an endless belt, preferably of wire, and B B′ the pulleys around which said belt passes, the pulleys turning and the belt traversing in the direction of the arrows. The belt has, at suitable intervals, projecting shoes, to which can be clutched the boxes or receptacles D, so that, supposing X to be a central station, and X′, X², and X³ sub-stations, the belt in passing from the pulley B to the pulley B′ will carry boxes from the central station to the sub-stations, and in passing from the pulley B′ to the pulley B will carry boxes from the sub-stations to the central station.

The clutching devices vary in character in accordance with the number of sub-stations, and each sub-station has a releasing device adapted to act upon one form of clutching device only, while the central station has a releasing device adapted to act upon all of the clutches, so that while one particular set of boxes only will be delivered at each sub-station all of the boxes will be delivered at the central station. In the diagram, the clutches have arms of different lengths, and the stations have fingers projecting to different extents. Thus the long arm of the clutch $x'$ is adapted to be actuated by the short finger $y'$ of the station X′, the shorter arm of the clutch $x^2$ will be actuated by the longer finger, $y^2$, of the station X², and the still shorter arm of the clutch $x^3$ will be actuated by the finger $y^3$ of the station X³, the finger $y$ of the central station, X, being of such a length as to actuate the arms of all of the clutches.

In the arrangement shown in Figs. 2 to 9, A is the belt, B B′ the pulleys, X the central station, and X′ X² X³ the sub-stations.

The endless belt is inclosed in tubes F, slotted on the under side for the passage of the stems of the shoes G, the heads G′ of the latter, which are secured to the belt, fitting snugly to the interior of the tubes, and, if desired, being furnished with packing-strips $a$ at each end, so as to render noiseless their passage through the tubes. (See Figs. 6 and 7.) The tubes are properly braced, and are supported at suitable intervals from the ceiling or other available fixture by means of hangers $b$, the tubes being at a proper distance above the heads of the attendants. Additional means of support are furnished by the posts $d$, which extend downward to the counters H at each sub-station. The means of supporting the tubes F, however, are immaterial to my invention, and may be modified in various ways; or the tubes may even be dispensed with in some cases, and the endless belt supported by means of rollers arranged at intervals. The tubes, however, are the most effective supporting mediums for the belt, and are preferred.

Each box D has in the present instance on the top of the lid a slotted sheath, $f$, for the reception of the shoe G, and the clutching device consists of an arm, $g$, pivoted to the sheath, acted upon by a spring, $h$, and having a notch adapted to the stem of the shoe.

On each post $d$ is adapted to slide an elevator, J, actuated by a cord and pulley, each elevator having an elastic clamp adapted to a rib, $m$, on the bottom of the box D. This clamp consists in the present instance of a fixed jaw, $n$, and a pivoted jaw, $n'$, the latter being acted upon by a spring, $p$, and the rib $m$ has at the rear end a guard-plate, $m'$, which prevents the application of the box to the retainer in any but the proper position.

On applying the box to the clamp and elevating the latter the sheath $f$ is brought into the path of one of the shoes on the belt A, and said shoe enters the sheath, the stem of the shoe forcing out the clutch-arm $g$ until the recess of the latter receives the stem, when the box will be withdrawn from the clamp and carried forward with the shoe.

At the central station I prefer to use a clamp pivoted so that it can be thrown into or out of the path of the shoes on the belt. These details, however, are not absolutely necessary to the carrying out of my invention, as the clamp may, if desired, occupy a fixed position in respect to the belt; or in some cases the clamp may be dispensed with, the boxes being simply held up by the hand in proper position for the shoes to engage with the clutching devices thereon.

Clutching devices of various kinds may also be used; and, if desired, the clutch may be on the shoe, instead of on the box; or the belt may have hooks or staples adapted to staples or hooks on the boxes, the hooks facing in such a direction that the boxes can be readily released by the action of a suitable striker. Where a pivoted arm-clutch such as that shown in Fig. 4 is used, some of the arms may be actuated by vertical projections, while others may have pins to be operated by horizontal projections, and some of the arms may be arranged on one side and others on the opposite side of the center of the box, so as to multiply the number of special releasing devices possible. Each station has in the present instance a pouch to receive the box when the latter is released from the shoe, the construction and arrangement of these pouches being modified as circumstances may suggest.

Figure 8:
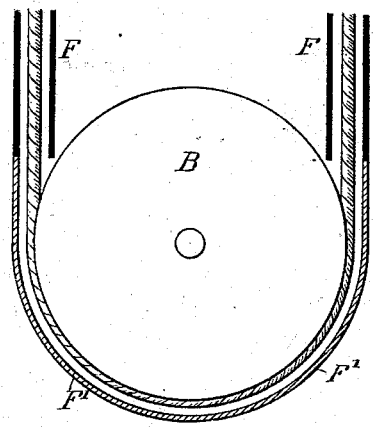
Figure 9:

In some cases I propose to use an endless tube, F, as well as an endless belt, the tube in this case having at each end segmental connections F', inclosing the pulleys, as shown in Figs. 8 and 9.

When the belt is made of wire, as shown, it may be advisable to cover the same, or provide it with supporting-washers at intervals, so as to prevent noise due to the contact of the belt with the interior of the tube.

I claim as my invention—

1. The combination of an endless belt and pulleys therefor, means for connecting boxes or receptacles to said belt, a series of special releasing devices each adapted to act upon the connections of one class of boxes only, and a general releasing device adapted to act upon the connections of all of the boxes, as set forth.

2. The combination of an endless belt, a slotted tube in which the belt runs, and a shoe having a head secured to the belt and adapted to the interior of the tube, and a stem passing through the slot of the said tube, as set forth.

3. The combination of an endless belt having projecting shoes, with boxes or receptacles having clutches, and with mechanism for releasing said clutches, as set forth.

4. The combination of an endless belt, boxes or receptacles, and means for clutching the same to the belt, with an elastic clamp adapted to retain the box until the clutch secures the same to the belt, as set forth.

5. The combination of an endless belt, boxes or receptacles, means for clutching the same to the belt, and elastic clamps adjustable from and toward the belt, as set forth.

6. The combination of the endless belt having shoes G, with the boxes or receptacles having sheaths $f$ and clutching-arms $g$, as set forth.

7. The combination of the endless belt, the pulleys B B', and the slotted tubes F, having connections F', inclosing the pulleys, as set forth.

8. The combination of the elastic clamp with a box having a rib, $m$, adapted to said clamp, as set forth.

9. The combination of the elastic clamp with a box having a rib, $m$, and guard $m'$, as set forth.

In testimony whereof I have signed my name to this specification in the presence of two subscribing witnesses.

WM. R. FOWLER.

Witnesses:
 HARRY DRURY,
 HARRY SMITH.